United States Patent [19]
Yashiro et al.

[11] Patent Number: 5,238,722
[45] Date of Patent: Aug. 24, 1993

[54] OPTICAL RECORDING MEDIUM

[75] Inventors: Toru Yashiro, Yokosuka; Yutaka Ueda, Yokohama, both of Japan

[73] Assignee: Ricoh Company, Ltd., Tokyo, Japan

[21] Appl. No.: 798,503

[22] Filed: Nov. 26, 1991

[30] Foreign Application Priority Data

Nov. 28, 1990 [JP] Japan .................. 2-326310

[51] Int. Cl.$^5$ .................. B32B 3/00
[52] U.S. Cl. .................. 428/64; 428/65; 428/457; 428/913; 430/945; 346/76 L; 346/135.1
[58] Field of Search .............. 428/64, 65, 457, 913; 430/945; 346/76 L, 135.1

[56] References Cited

U.S. PATENT DOCUMENTS

| | | | |
|---|---|---|---|
| 4,188,214 | 2/1980 | Kido et al. | 430/494 |
| 4,358,780 | 11/1982 | Sato | 346/135.1 |
| 4,879,205 | 11/1989 | Suzuki | 430/523 |
| 4,899,168 | 2/1990 | Osato et al. | 346/1.1 |

OTHER PUBLICATIONS

U.S. patent application Ser. No. 07/577,877, filed Sep. 5, 1990, T. Yashiro et al.; U.S. Pat. No. 5,169,745 to issue Dec. 8, 1992.

*Primary Examiner*—Patrick J. Ryan
*Assistant Examiner*—Elizabeth Evans
*Attorney, Agent, or Firm*—Cooper & Dunham

[57] ABSTRACT

An optical recording medium is composed of a substrate, a recording layer containing an inorganic material which includes as the main component a sulfide of at least one element selected from the group consisting of the elements of IIb, IIIb, IVb, Vb, and VIb groups, which is formed on the substrate, with a complex index of refraction of $(n-ik)$, where $n \geq 1.8$, and $k \leq 0.3$, and a reflection layer formed on the recording layer. In this invention, an intermediate layer can be interposed either between the substrate and the recording layer, or between the recording layer and the reflection layer.

6 Claims, 2 Drawing Sheets

OPTICAL RECORDING MEDIUM

BACKGROUND OF THE INVENTION

1. Field of the Invention

The present invention relates to an optical recording medium such as an optical disc, and more particularly to a write-once type compact disc on which information signals which meet the requirements of the International Compact Disc Standards can be recorded and from which information signals recorded thereon can be reproduced.

2. Discussion of Background

Development of write-once type compact discs provided with a recording function has recently become very active. The object of the development of such write-once type compact discs is to obtain compact discs from which recorded information can be reproduced by commercially available compact disc players. Therefore these compact discs must meet the requirements of the International Compact Disc Standards. In these Standards, the compacts are required to have a reflectivity as high as 70% or more. Many of these compact discs have a structure which includes a reflection layer made of a metal such as gold or aluminum.

Japanese Laid-Open Patent Application 2-87339 discloses an optical recording medium which comprises a substrate, a light-absorbing layer which is formed on the substrate by spin-coating a dye which absorbs a laser beam, and a reflection layer made of a metal overlaid on the light-absorbing layer. This optical recording medium satisfies the requirements of the International Compact Disc Standards, in particular with respect to various signal levels and the reflectivity, so that the reproduction of recorded information therefrom by a commercially available compact disc player is possible.

As mentioned above, the dye employed in this optical recording medium absorbs the laser beam. However, such a dye does not have a maximum absorption to the wavelength of the laser beam employed. If a dye having a maximum absorption to the wavelength of the laser beam is used, the absorption of the laser beam by the dye is so great that little light is reflected from the reflection layer provided on the back side of the light-absorbing layer. The result is that the requirement for the reflectivity of 70% or more cannot be met. For this reason, the dye employed in this optical recording medium is selected from dyes which do not have a maximum absorption with respect to the wavelength of the laser beam employed, and a high reflectivity is obtained by utilizing the effects of the multiple reflection interferences on the opposite sides of the dye-containing light-absorbing layer. Hereinafter this dye-containing light-absorbing layer is referred to as the dye layer. In order to obtain a high reflectivity by utilizing the interference effects, the complex index of refraction $(n-ik)$ and the thickness of the dye layer must be optimized. The optimum values of the complex index of refraction $(n-ik)$, and the thickness are respectively obtained when $n \geq 1.8$, and $k \leq 0.3$, and when the thickness is in the range of 100 nm to 200 nm.

However, when a dye layer with such a thickness is formed by the spin-coating method on a substrate in which pregrooves for tracking have been made, those pregrooves are completely filled with the dye layer, so the problem is created in that it is difficult to produce track error signals therefrom. This problem could be avoided by providing deeper grooves which cannot be completely filled with the dye layer. However, the production of a substrate with such deeper grooves is not easily accomplished by injection molding.

Furthermore, in order to produce the dye layer with the above-mentioned thickness by the spin coating method, it is necessary that a coating liquid for the spin coating contain the dye in high concentration. In order to attain this, the dyes employed in this method are required to have high solubility in the solvents for the coating liquid. The number and kind of dyes that can be employed in this method are extremely limited by this requirement.

In order to produce the recording medium at low cost, it is preferable that a recording layer be directly formed on a substrate made by injection molding, without interposing an undercoat layer between the substrate and the recording layer. However, polycarbonate resin and acrylic resin which are mostly employed for the substrate of the recording medium are not resistant to solvents, and the solvents that can be employed with such resins are strictly limited to alcohol solvents. Thus, this method has the problem that the selection of the dyes and solvents for the coating liquid is difficult.

There is a method of forming a recording layer by the spin coating method, and providing a reflection layer on the recording layer by the vacuum film formation method. The productivity of this method is not good because both a wet process for the spin coating and a dry process for the vacuum film formation method must be employed.

SUMMARY OF THE INVENTION

It is therefore an object of the present invention to provide a write-once type optical recording medium with a recording layer which provides sufficient track error signals for use in practice, even when it is formed on the substrate for a conventional write-once type optical recording medium, with grooves having a conventional thickness, for instance, by a conventional vacuum film formation method, such as the vacuum deposition method or the sputtering method.

The above object of the present invention can be achieved by an optical recording medium comprising a substrate, a recording layer comprising an inorganic material comprising as the main component a sulfide of at least one element selected form the group consisting of the elements if IIb, IIIb, IVb, Vb, and VIb groups, which is formed on the substrate, with a complex index of refraction of $(n-ik)$, where $n \geq 1.8$, and $k \leq 0.3$, and a reflection layer formed on the recording layer. In this invention, an intermediate layer can be interposed either between the substrate and the recording layer, or between the recording layer and the reflection layer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

The present invention will now be explained in more detail by reference to the accompanying drawings.

Figure 1:
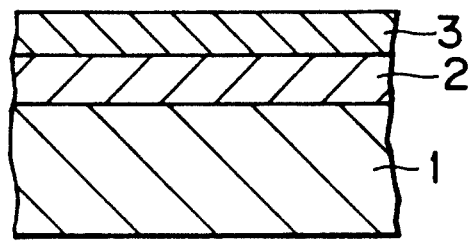
FIG. 1 is a schematic cross-sectional view of an example of an optical recording medium according to the present invention.
Figure 2:
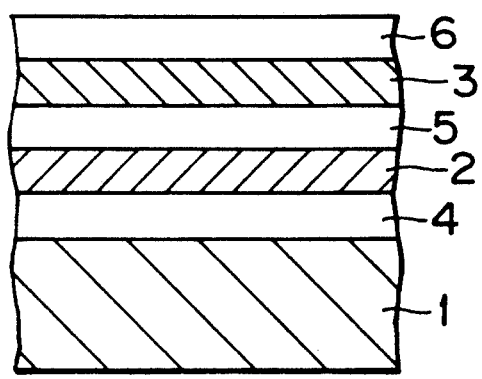
FIG. 2 is a schematic cross-sectional view of another example of an optical recording medium according to the present invention.

FIG. 1 is a schematic cross-sectional view of an example of an optical recording medium according to the present invention. In this example, a recording layer 2 is provided on a substrate 1. A reflection layer 3 is further provided on the recording layer 2. As shown in FIG. 2, when necessary, an undercoat layer 4 may be provided between the substrate 1 and the recording layer 2, and an intermediate layer 4 may be provided between the recording layer 2 and the reflection layer 3. Furthermore, a protective layer 6 may be provided on the reflection layer 3.

Examples of the substrate 1 include a transparent plastic substrate, and a glass substrate. More specifically, examples of the material for the substrate 1 are polycarbonate resin, polyolefin resin, acrylic resin, epoxy resin, quartz glass, and reinforced glass.

On the surface of the substrate 1, guide grooves or guide pits for tracking, and preformats for address signals may be formed.

The recording layer 2 comprises an inorganic material comprising as the main component a sulfide of at least one element selected form the group consisting of the elements of IIb, IIIb, IVb, Vb, and VIb groups, which is formed on the substrate, with a complex index of refraction of $(n-ik)$, where $n \geq 1.8$, and $k \leq 0.3$. Specific examples of the element include Sb, Sn, In, Ge, and O.

Specific examples of the sulfide are $Sb_2S_3$, $SnS$, $(Sb_2S_3)_x(In_2S_3)_y$, $(Sb_2S_3)_x(GeS)_y$, $(SnS)_x(In_2S_3)_y$, $(SnS)_x(GeS)_y$, $(SnS)_xO_y$, and $(Sb_2S_3)_xO_y$, wherein $40 \leq x < 100$, $0 < y \leq 60$, and $x + y = 100$.

The thickness of the recording layer 2 varies depending on the complex index of refraction $(n-ik)$, but it is preferable that the thickness be in the range of about 100 nm to 200 nm by which high reflectivity can be obtained by the multiple reflection interference effects at the opposite sides of the recording layer 2.

The recording layer 2 can be formed either on the substrate 1 or on the undercoat layer 4 by a conventional vacuum film formation method, such as the vacuum deposition method or the sputtering method.

The reflection layer 3 can be made of metals, or semi-metals having high reflectivity. Specific examples of such metals and semi-metals are Au, Ag, Cu, Al, Cr, and Ni, preferably Au and Al. These metals may be used individually or in the form of alloys.

The undercoat layer 4 and the intermediate layer 5 are provided for the purposes of (a) protecting the recording layer 2 from moisture and gases, thereby serving as a barrier layer, (b) improving the preservability and stability of the recording layer 2, (c) improving the reflectivity of the recording layer 2, and (d) forming pregrooves in the substrate 1.

Specific examples of the material for the undercoat layer 4 and the intermediate layer 5, particularly for the purposes (a) and (b), are polymers such as acrylic resin and epoxy resin, and inorganic materials such as $SiO_2$, ZnS, SiN, and TiN.

For the purpose (c), inorganic materials such as $SiO_2$, ZnS, SiN, TiN, AlN, and $Si_3N_4$ are suitable, and for the purpose (d), ultraviolet curing resin, thermosetting resin, and thermoplastic resin can be employed.

The thicknesses of the undercoat layer 4 and the intermediate layer 5 vary depending on the kind of materials employed. However, it is preferable that these layers have a thickness in the range of about 0.01 μm to 30 μm.

The protective layer 6 is provided for protecting the recording layer 2 from scratching or smearing or form dust, and for improving the preservability and stability of the recording layer 2. The protective layer 6 can be made of the same materials as those employed in the undercoat layer 4 and the intermediate layer 5. The thickness of the protective layer 5 varies depending on the kind of materials employed as in the cases of the undercoat layer 4 and the intermediate layer 5. However, it is preferable that the protective layer have a thickness in the range of about 0.1 μm to 100 μm.

The protective layer 6, the undercoat layer 4 and the intermediate layer 5 can be formed by conventional methods, for instance, by the vacuum film formation method such as the vacuum deposition method or the sputtering method when these layers are made of inorganic materials, or by a liquid coating method such as the spinner coating method, the spray coating method, or the immersing coating method, when organic materials dispersed in a liquid are coated.

EXAMPLE 1

A pregrooved polycarbonate disc with pregrooves having a width of 0.8 μm, depth of 700 Å, and a track pitch of 1.6 μm was formed by injection molding.

On this disc, a recording layer of $Sb_2S_3$ with a thickness in the range of 1000 Å to 2000 Å, with a complex index of refraction $(n-ik)$ which satisfies the conditions of $n \geq 1.8$, and $k \leq 0.3$ by the fitting of the theoretical spectral characteristics, was formed on the polycarbonate substrate using a vacuum deposition apparatus of a resistance heating type. On this recording layer, a layer of Au with a thickness of about 1000 Å was formed by the above vacuum deposition apparatus, whereby an optical recording medium No. 1 according the present invention was fabricated.

EXAMPLES 2 to 4

The procedure for Example 1 was repeated except that the material $Sb_2S_3$ for the recording layer was replaced by SnS, $(Sb_2S_3)_{65}(In_2S_3)_{35}$, and $(SnS)_{65}(In_2S_3)_{35}$, respectively, whereby optical recording media No. 2, No. 3, and No. 4 according to the present invention were prepared.

COMPARATIVE EXAMPLE

A dye layer with a thickness of about 1400 Å was formed on the same polycarbonate substrate as used in Example 1 by spin-coating a cyanine dye with the following formula, which was dissolved in a mixed solvent of methanol and 1,2-dichloroethane, and drying the same:

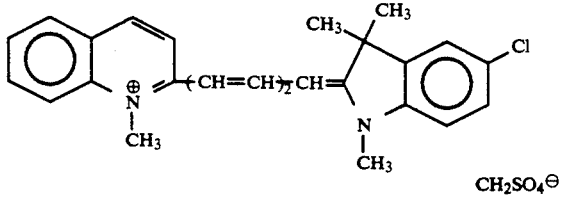

On this dye layer, a reflection layer of Au with a thickness of about 1000 Å was formed under the same preparation conditions as in Example 1, whereby a comparative optical recording medium was fabricated.

Figure 3:
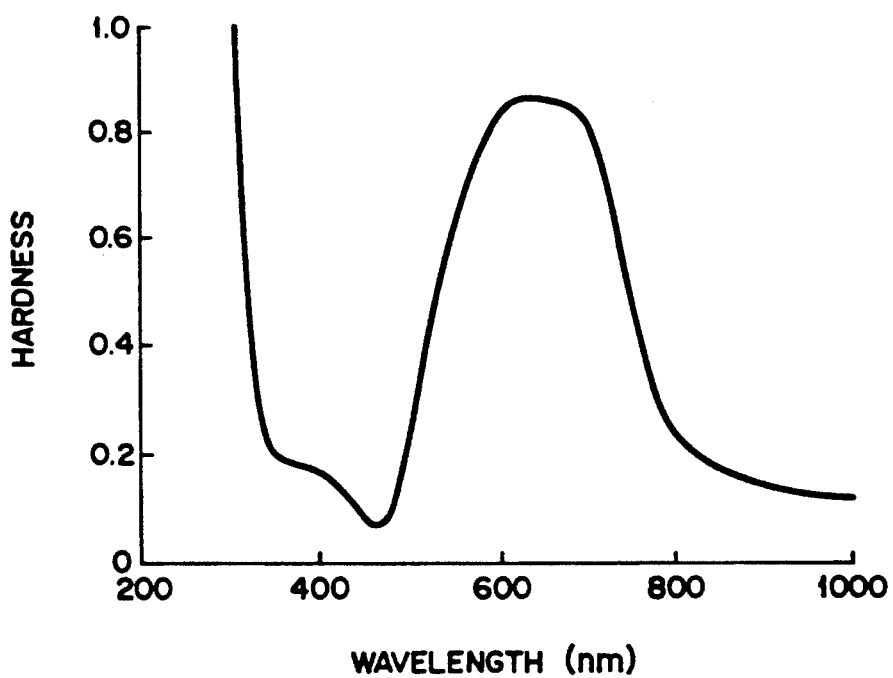
FIG. 3 is an absorption spectrum of a dye layer employed in the present invention.

FIG. 3 shows an absorption spectrum of the dye layer.

In each of the above fabricated optical recording media No. 1 to No. 4 and the comparative optical recording medium, EFM signals were recorded and reproduced with a line speed of 1.3 m/sec, a recording laser power of 6 mW, and a reproduction laser power of 0.5 mW with a wavelength of 780 nm, so that the waveform of the reproduction signals and the track error signals were inspected. The results are shown in the following Table 1:

TABLE 1

| Materials for Recording Layer | Modulation Degree | | Reflectivity (%) | Amplitude of Track Error Signal (Arbitrary Unit) |
|---|---|---|---|---|
| | $I_{11}/Itop$ | $I_3/Itop$ | (*) | |
| Ex. 1 | $Sb_2S_3$ | 82 | 49 | 72 | 820 |
| Ex. 2 | SnS | 79 | 47 | 70 | 820 |
| Ex. 3 | $(Sb_2S_3)_{65}*$ $(In_2S_3)_{35}$ | 81 | 49 | 74 | 840 |
| Ex. 4 | $(SnS)_{65}*$ $(In_2S_3)_{35}$ | 80 | 47 | 70 | 830 |
| Comp. Ex. | cyanine dye | 75 | 49 | 70 | 310 |

(*) The reflectivity in Table 1 was estimated from the level of the reproduction signal from the flat surface of the recording medium.

The results shown in the above table indicate that the optical recording media of the present invention can provide a signal level ($I_{11}/Itop \geq 0.6$, $0.3 \leq I_3/Itop \leq 0.6$) which satisfies the requirements of the International Compact Disc Standards and these media have reflectivities of 70% or more. Furthermore, these recording media of the present invention provide larger track error signals than those provided by the comparative optical recording medium.

According to the present invention, the recording layer comprises an inorganic material comprising as the main component a sulfide of at least one element selected from the group consisting of the elements of IIb, IIIb, IVb, Vb, and VIb groups, which is formed on the substrate, with a complex index of refraction of (n−ik), where n ≥ 1.8, and k ≤ 0.3, so that an optical recording medium capable of meeting the requirements of the International Compact Disc Standards, in particular, with respect to the high reflectivity of 70% or more, can be provided by forming the above recording layer on a substrate, and then overlaying a reflection layer made of a metal such as Au or Al.

Furthermore, the recording layer can be formed without difficulty by the vacuum film deposition method as mentioned previously, so that even if a thick recording layer is formed, the problem that the grooves are filled with the recording layer is not caused as in the case where the recording layer is formed by spin coating. Therefore, the generation of large track error signals can be securely attained. In connection with this, according to the present invention, the recording layer and the reflection layer can be prepared by a continuous dry process, so that the productivity of the recording medium according to the present invention is high.

In the optical recording medium of the present invention, it is possible to change the phase or the shape of the recording layer by recording radiation, for instance, using laser beams to form recording pits. It has been confirmed that the optical recording media of the present invention can satisfy the requirements of the recording of signals and the reproduction thereof in accordance with the International Compact Disc Standards.

Furthermore, according to the present invention, sufficiently large track error signals can be obtained even when a substrate with grooves with a conventional thickness is used.

What is claimed is:

1. An optical recording medium comprising a substrate, a recording layer overlying said substrate, and a reflection layer overlying said recording layer, said recording layer having a complex index of refraction n−ik wherein n ≥ 1.8 and k ≤ 0.3 and consisting essentially of at least one sulfide of at least one element selected from the group consisting of the elements of IIb, IIIb, IVb, Vb and VIb groups.

2. The optical recording medium as claimed in claim 1, wherein said element is selected from the groups consisting of Sb, Sn, In, Ge, and O.

3. The optical recording medium as claimed in claim 1, wherein said sulfide is selected from the group consisting of $Sb_2S_3$, SnS, $(Sb_2S_3)_x(In_2S_3)_y$, $(Sb_2S_3)_x(GeS)_y$, $(SnS)_x(In_2S_3)_y$, $(SnS)_x(GeS)_y$, $(SnS)_xO_y$, and $(Sb_2S_3)_xO_y$, wherein $40 \leq x < 100$, $0 < y \leq 60$, and $x+y=100$.

4. The optical recording medium as claimed in claim 1, wherein said reflection layer is made of a metal selected from the group consisting of Au, Ag, Cu, Al, Cr, Ni and alloys of these metals.

5. The optical recording medium as claimed in claim 1, further comprising an undercoat layer which is interposed between said substrate and said recording layer.

6. The optical recording medium as claimed in claim 1, further comprising an intermediate layer which is interposed between said recording layer and said reflection layer.

* * * * *